United States Patent
Hirano et al.

(10) Patent No.: US 10,353,159 B2
(45) Date of Patent: Jul. 16, 2019

(54) OPTICAL CONNECTING DEVICE, OPTICAL PROCESSING APPARATUS, METHOD FOR FABRICATING OPTICAL CONNECTING DEVICE, METHOD FOR FABRICATING OPTICAL PROCESSING APPARATUS

(71) Applicant: SUMITOMO ELECTRIC INDUSTRIES, LTD., Osaka (JP)

(72) Inventors: Mitsuharu Hirano, Yokohama (JP); Akira Furuya, Yokohama (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/887,478

(22) Filed: Feb. 2, 2018

(65) Prior Publication Data

US 2018/0231725 A1   Aug. 16, 2018

(30) Foreign Application Priority Data

Feb. 13, 2017   (JP) ................................. 2017-024162

(51) Int. Cl.
*G02B 6/42*   (2006.01)
*G02B 6/38*   (2006.01)
*G02B 6/34*   (2006.01)

(52) U.S. Cl.
CPC ........... *G02B 6/428* (2013.01); *G02B 6/3839* (2013.01); *G02B 6/3885* (2013.01); *G02B 6/426* (2013.01); *G02B 6/4231* (2013.01); *G02B 6/4292* (2013.01); *G02B 6/34* (2013.01); *G02B 6/4214* (2013.01)

(58) Field of Classification Search
CPC ........ G02B 6/42; G02B 6/428; G02B 6/4231; G02B 6/426
See application file for complete search history.

(56) References Cited

U.S. PATENT DOCUMENTS

| | | | | |
|---|---|---|---|---|
| 5,412,748 A | * | 5/1995 | Furuyama | G02B 6/3839 257/98 |
| 5,652,816 A | * | 7/1997 | Minami | G02B 6/1221 385/31 |
| 5,715,338 A | * | 2/1998 | Sjolinder | G02B 6/3873 385/14 |

(Continued)

FOREIGN PATENT DOCUMENTS

WO   WO 02/079831   10/2002

*Primary Examiner* — Thomas A Hollweg
*Assistant Examiner* — Mary A El-Shammaa
(74) *Attorney, Agent, or Firm* — Smith, Gambrell & Russell, LLP

(57) ABSTRACT

An optical connecting device includes: a holder; an optical fiber supported by the holder; and a guide part supported by the holder. The holder includes first and second resin bodies arranged apart from each other, a supporting part, and a first lid part, a supporting groove, and a groove. The connecting device features: the first resin body being in contact with the optical fiber between the supporting part and the first lid part, the guide part being supported in the groove, the second resin body bonding the guide part to the supporting part, the optical fiber extending in the support groove in the principal surface of the supporting part, and the first lid part being disposed apart from the guide part on the optical fiber, and the optical fiber being between the supporting part and the first lid part.

20 Claims, 9 Drawing Sheets

(56) References Cited

U.S. PATENT DOCUMENTS

| | | | | |
|---|---|---|---|---|
| 6,341,899 B1* | 1/2002 | Shirakawa | ............ | G02B 6/3817 |
| | | | | 385/53 |
| 6,499,889 B1* | 12/2002 | Shirakawa | ............ | G02B 6/3817 |
| | | | | 257/99 |
| 9,971,113 B2* | 5/2018 | Hara | ................... | G02B 6/4245 |
| 2002/0136506 A1* | 9/2002 | Asada | ................ | G02B 6/4277 |
| | | | | 385/92 |
| 2002/0196997 A1* | 12/2002 | Chakravorty | ............ | G02B 6/42 |
| | | | | 385/14 |
| 2003/0063889 A1* | 4/2003 | Lavallee | ................ | G02B 6/32 |
| | | | | 385/137 |
| 2004/0131318 A1* | 7/2004 | Mori | ................... | G02B 6/4201 |
| | | | | 385/92 |
| 2006/0140551 A1* | 6/2006 | Yu | ....................... | G02B 6/4201 |
| | | | | 385/92 |
| 2007/0206902 A1* | 9/2007 | Blauvelt | ............. | G02B 6/4201 |
| | | | | 385/49 |
| 2011/0200284 A1* | 8/2011 | Zhovnirovsky | ......... | G02B 6/32 |
| | | | | 385/33 |
| 2013/0343711 A1* | 12/2013 | Sano | ................... | H01R 12/716 |
| | | | | 385/88 |
| 2014/0326861 A1* | 11/2014 | Lee | ......................... | G02B 6/12 |
| | | | | 250/227.11 |
| 2015/0205059 A1* | 7/2015 | Satake | ................ | G02B 6/4248 |
| | | | | 385/49 |

* cited by examiner

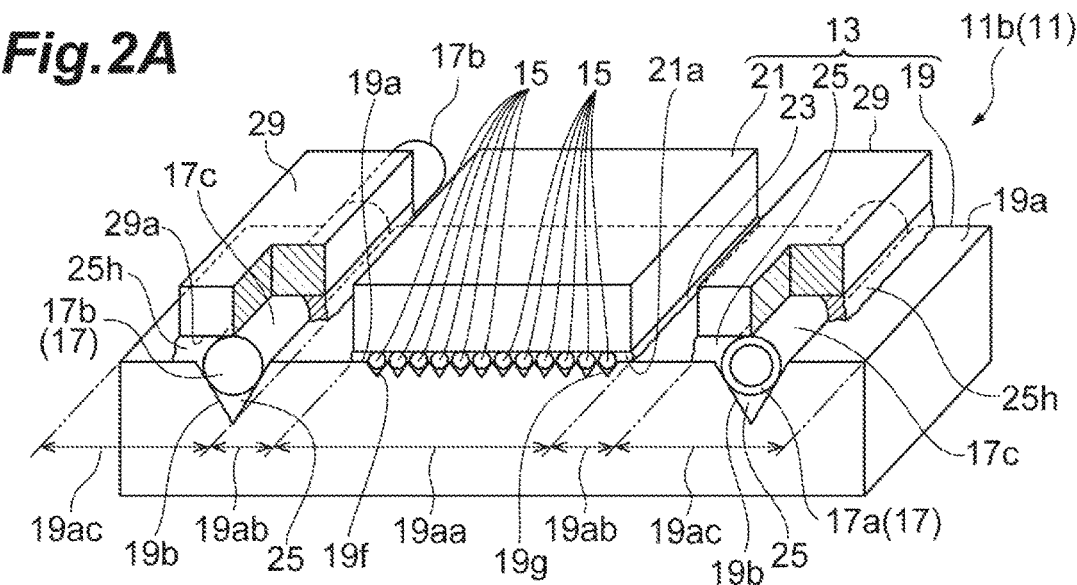
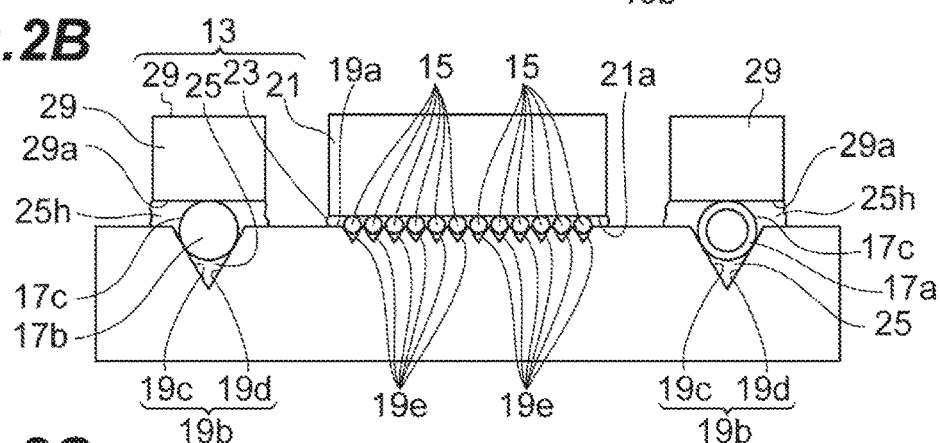
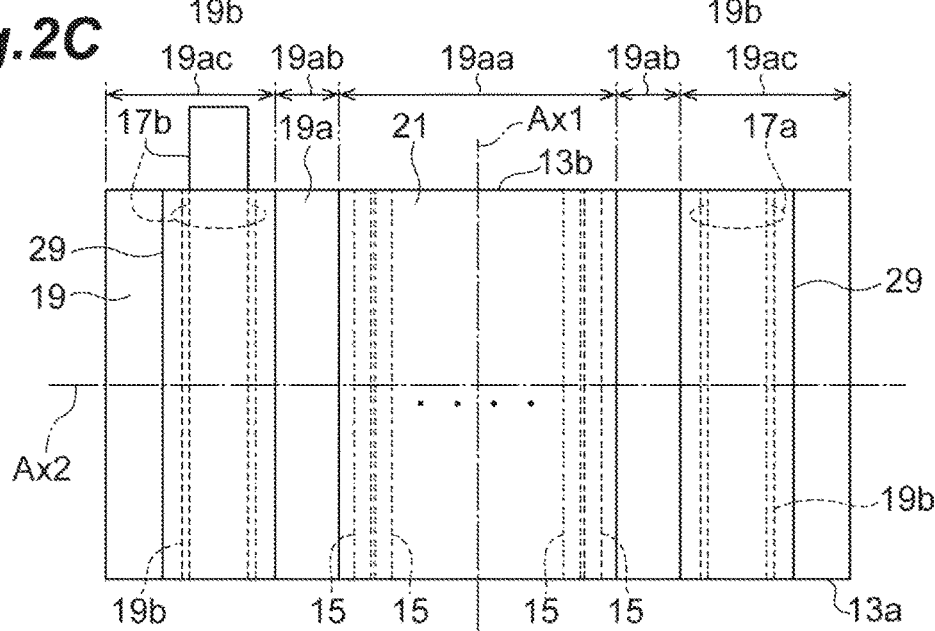

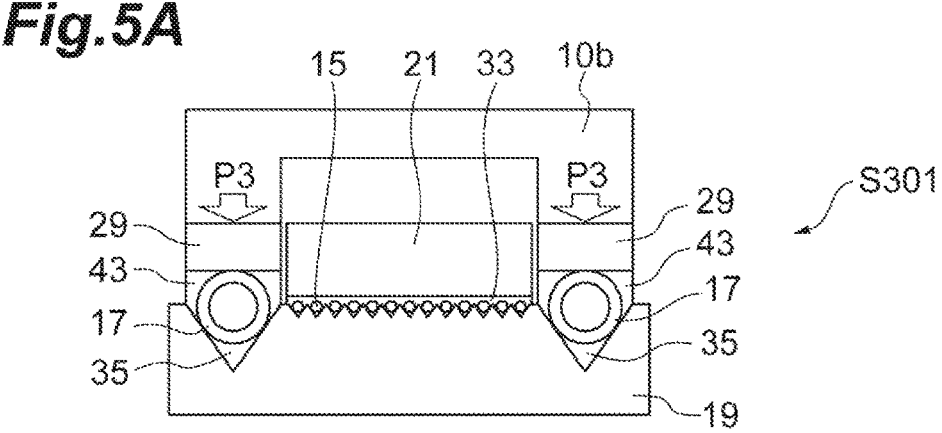
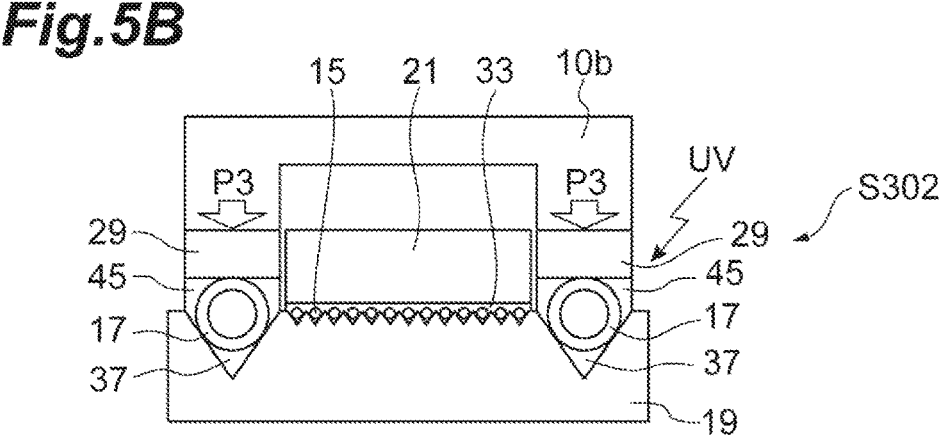
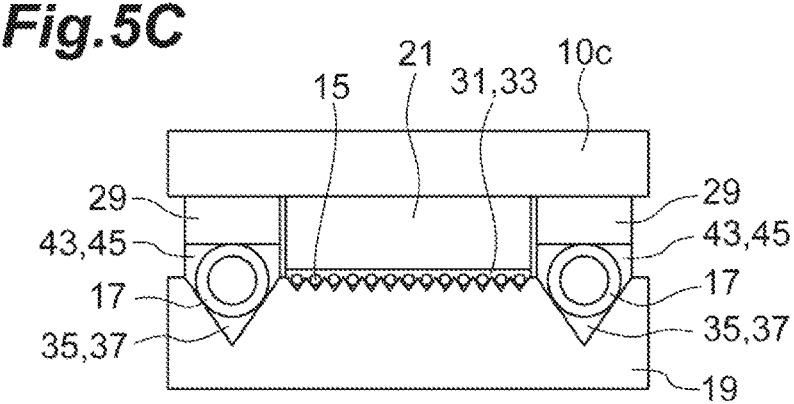

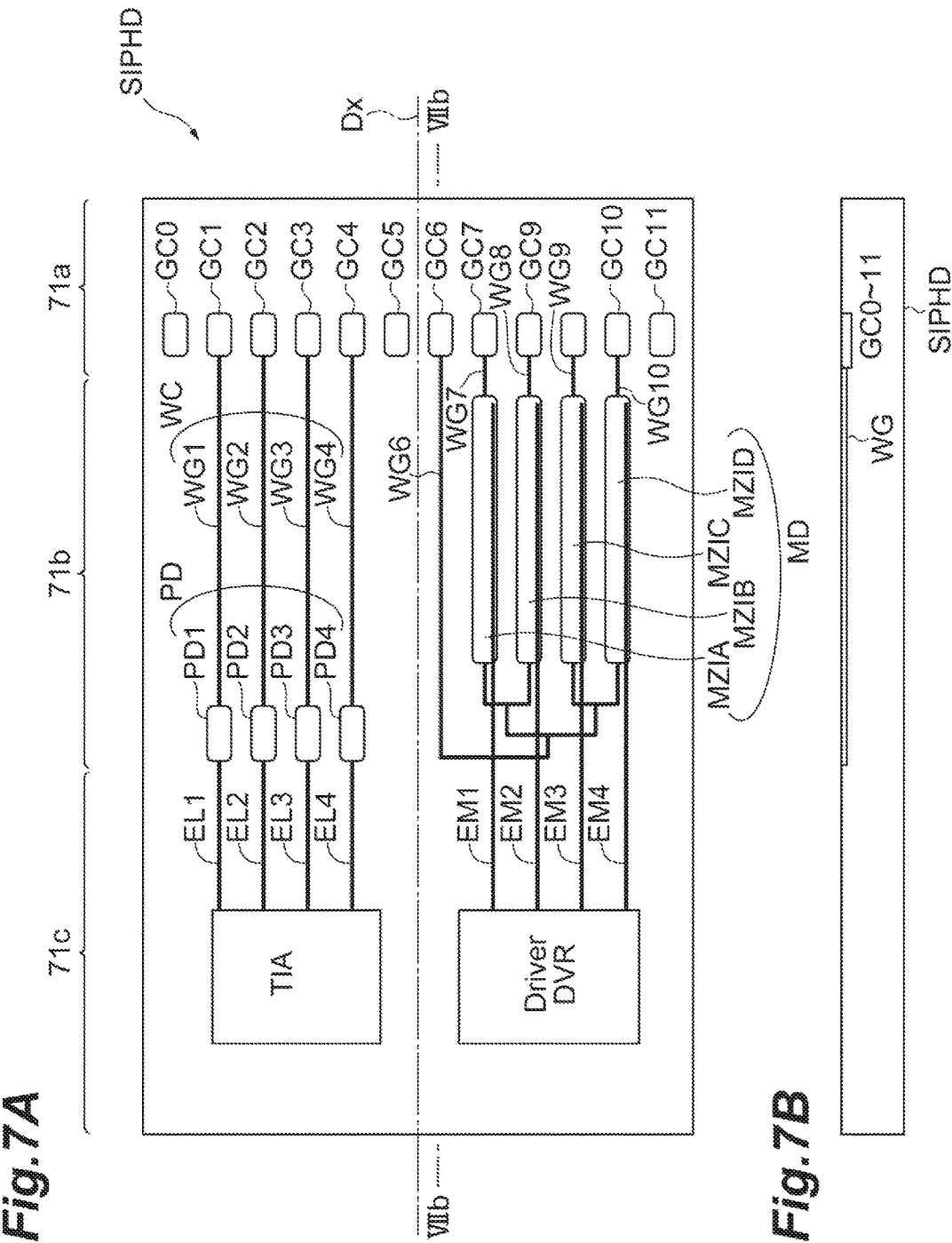

OPTICAL CONNECTING DEVICE, OPTICAL PROCESSING APPARATUS, METHOD FOR FABRICATING OPTICAL CONNECTING DEVICE, METHOD FOR FABRICATING OPTICAL PROCESSING APPARATUS

BACKGROUND OF THE INVENTION

Field of the Invention

The present invention relates to an optical connecting device, an optical processing apparatus, a method for fabricating an optical connecting device, and a method for fabricating an optical processing apparatus. This application claims the benefit of priority from Japanese Patent Application No. 2017-024162 filed on Feb. 13, 2017, which is herein incorporated by reference in its entirety.

Related Background Art

International Publication WO 2002/079831 (referred to as Patent Document 1) discloses an optical fiber array.

SUMMARY OF THE INVENTION

An optical connecting device according to one aspect of the present invention includes: a holder; an optical fiber supported by the holder; and a guide part supported by the holder, the holder including a first resin body, a second resin body, a supporting part, and a first lid part, the supporting part having a principal surface, and a groove extending in a direction of a first axis on the principal surface, the groove having a first face and a second face, the first resin body being disposed in contact with the optical fiber between the supporting part and the first lid part, the guide part being supported in the groove by the first face and the second face, the second resin body bonding the guide part to the supporting part, the optical fiber extending in the direction of the first axis on the principal surface of the supporting part, and the first lid part being disposed apart from the guide part on the optical fiber, the optical fiber being between the principal surface of the supporting part and a principal surface of the first lid part.

An optical processing apparatus according to another aspect of the present invention includes: an optical connecting device; and a silicon photonics device mounting the optical connecting device so as to be optically coupled to the optical connecting device. The optical connecting device according to an embodiment includes: a holder; an optical fiber supported by the holder; and a guide part supported by the holder, the holder including a first resin body, a second resin body, a supporting part, and a first lid part, the supporting part having a principal surface, and a groove extending in a direction of a first axis on the principal surface, the groove having a first face and a second face, the first resin body being disposed in contact with the optical fiber between the supporting part and the first lid part, the guide part being supported in the groove by the first face and the second face, the second resin body bonding the guide part to the supporting part, the optical fiber extending in the direction of the first axis on the principal surface of the supporting part, and the first lid part being disposed apart from the guide part on the optical fiber, the optical fiber being between the principal surface of the supporting part and a principal surface of the first lid part.

A method for fabricating an optical connecting device according to yet another aspect of the present invention includes: preparing a supporting part including a groove with a first face and a second face, the first face and the second face extending in a direction of a first axis; placing an optical fiber and a first resin on a principal surface of the supporting part; placing a first lid part on the first resin and the optical fiber outside the groove; curing the first resin after the first lid is placed; placing a second resin and a guide part on the principal surface of the supporting part; and curing the second resin after the second resin and the guide part are placed, the first lid part is pressed in curing the first resin, and the guide part is supported by the first face and second face of the groove in curing the second resin.

A method for fabricating an optical processing apparatus according to still another aspect of the present invention includes: preparing an assembly including an optical connecting device and a silicon photonics device mounting the optical connecting device; disposing a semiconductor device and the silicon photonics device of the assembly on a circuit board; and after disposing the semiconductor device and the silicon photonics device, applying a thermal process for solder reflow to the circuit board. The optical connecting device according to an embodiment includes: a holder; an optical fiber supported by the holder; and a guide part supported by the holder, the holder including a first resin body, a second resin body, a supporting part, and a first lid part, the supporting part having a principal surface, and a groove extending in a direction of a first axis on the principal surface, the groove having a first face and a second face, the first resin body being disposed in contact with the optical fiber between the supporting part and the first lid part, the guide part being supported in the groove by the first face and the second face, the second resin body bonding the guide part to the supporting part, the optical fiber extending in the direction of the first axis on the principal surface of the supporting part, and the first lid part being disposed apart from the guide part on the optical fiber, the optical fiber being between the principal surface of the supporting part and a principal surface of the first lid part.

BRIEF DESCRIPTION OF THE DRAWINGS

The above-described objects and the other objects, features, and advantages of the present invention become more apparent from the following detailed description of the preferred embodiments of the present invention proceeding with reference to the attached drawings.

FIG. 2A is a partially-exploded perspective view showing an optical connecting device according to the present embodiment.

FIG. 2B is a front elevational view showing the optical connecting device according to the present embodiment.

FIG. 2C is a plan view showing the optical connecting device according to the present embodiment.

FIG. 5A is a schematic view showing a step for providing additional resin and a second lid part on the guide parts in the method for fabricating the optical connecting device according to the present embodiment.

FIG. 5B is a schematic view showing a step for curing the additional resin to secure the second lid part to the guide parts with the additional second resin body thus cured in the method for fabricating the optical connecting device according to the present embodiment.

FIG. 5C is a schematic view showing a step for curing both first resin and the second resin in a single thermal treatment in the method for fabricating the optical connecting device according to the present embodiment.

FIG. 7A is a plan view showing an exemplary silicon photonics semiconductor chip applicable to the optical processing apparatus according to the present embodiment.

FIG. 7B is a cross-sectional view taken along VIIb-VIIb line shown in FIG. 7A.

DESCRIPTION OF THE EMBODIMENTS

Figure 1A:
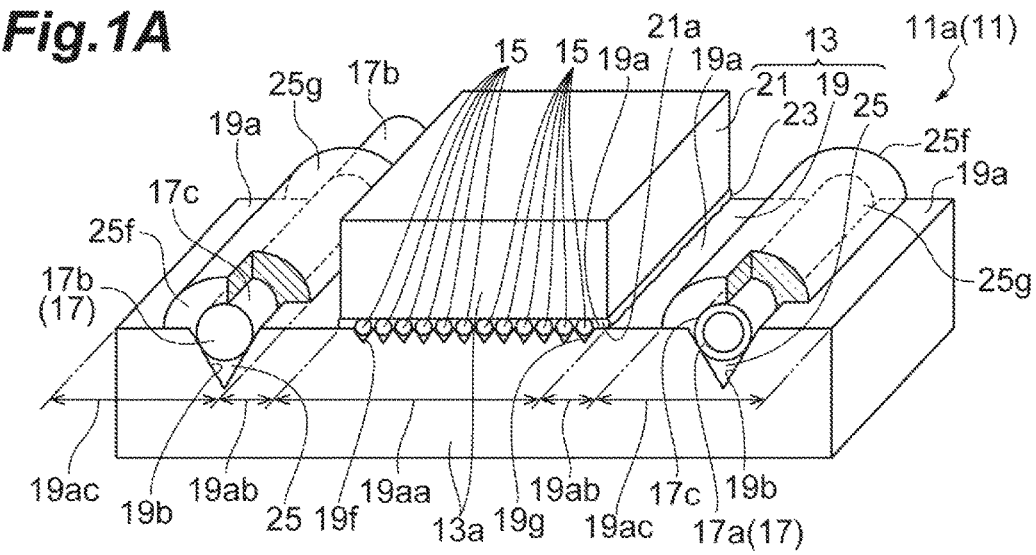
FIG. 1A is a partially-exploded perspective view showing an optical connecting device according to the present embodiment.

The optical fiber array in Patent Document 1 includes two substrates between which a guide pin and optical fibers are disposed. These substrates are bonded to each other with resin to form a holder. Inventors' findings reveal that optical fiber arrays that can withstand heat treatment in a solder reflow process are of wide application.

Inventors' studies reveal that the optical fiber array in Patent Document 1 may not withstand heat treatment of solder reflow. Specifically, the guide pin and the holder include different materials, which results in that the guide pin and the holder have different thermal expansion coefficients. The arrangement of the guide pin, the holder and the optical fibers is subjected to a temperature of 200 degrees Celsius or higher in the heat treatment in the solder reflow process. The guide part, such as guide pin, and the holder thermally expand during the solder reflow process as the temperature rises. The thermal expansion of the guide part exerts reverse-directional forces in the respective substrates in the holder to separates these substrates. What is needed is a structure that can withstand thermal stress in the heat treatment for solder reflow.

It is an object of one aspect of the present invention to provide an optical connecting device having a structure that can withstand thermal stress in the heat treatment for solder reflow. It is an object of another aspect of the present invention to provide an optical processing apparatus including the optical connecting device. It is an object of further aspect of the present invention to provide a method for fabricating the optical connecting device. It is an object of still another aspect of the present invention to provide a method for fabricating the optical processing apparatus.

Embodiments according to the present above aspects will be described below.

An optical connecting device according to an embodiment includes: (a) a holder; (b) an optical fiber supported by the holder; and (c) a guide part supported by the holder, the holder including a first resin body, a second resin body, a supporting part, and a first lid part, the supporting part having a principal surface, and a groove extending in a direction of a first axis on the principal surface, the groove having a first face and a second face, the first resin body being disposed in contact with the optical fiber between the supporting part and the first lid part, the guide part being supported in the groove by the first face and the second face, the second resin body bonding the guide part to the supporting part, the optical fiber extending in the direction of the first axis on the principal surface of the supporting part, and the first lid part being disposed apart from the guide part on the optical fiber, the optical fiber being between the principal surface of the supporting part and a principal surface of the first lid part.

The optical connecting device allows the support part and the first lid part to position the optical fiber between the principal surfaces of the support part and the first lid part, and the first lid part is apart from the guide part supported by the first and second faces of the groove of the support part. The guide part is made of a material different from materials of the support part and the first lid part, and the guide part has a thermal expansion coefficient different from the thermal expansion coefficients of the support and first lid parts. Separating the first lid part from the guide part can prevent the deformation of the guide part, which is caused by temperature change, from transferring to the first lid part that fixes the optical fiber.

In the optical connecting device according to an embodiment, the guide part includes one of a pin and a pipe each having a side face extending in the direction of the first axis, and the first resin body is apart from the second resin body.

The optical connecting device may provide a rod protruding from the end face of the holder with the optical connecting device, and the protrusion allows the insertion of the rod into the guide hole of an optical connector to be coupled to the optical connecting device. The optical connecting device may provide a pipe having a guide hole with the optical connecting device, and the guide hole of the pipe allows the reception of the guide pin of the optical connector to be coupled to the optical connecting device.

In the optical connecting device according to an embodiment, the holder include a second lid part, and the second lid part is disposed apart from the first lid part on the guide part, and the guide part is disposed between the groove of the supporting part and the principal surface of the first lid part.

The optical connecting device may separate the first lid part from the second lid part, and the separation can prevent the thermal deformation of the guide part from transferring to the first lid part.

In the optical connecting device according to an embodiment, the principal surface of the supporting part has a first area, a second area, and a third area, the first area is in contact with the first resin body and supports the optical fiber, the second area is between the first area and the groove, the first area, the second area and the third area are arranged in a direction of a second axis intersecting with the first axis, and the second area is between the first area and the second area, and the second resin body includes a coating film, the coating film is in contact with the third area of the supporting part and a side face of the guide part, and extends along the side face of the guide part in a direction from one of the first area and the third area to the other.

The optical connecting device, the coating resin film has an outward face that extends to the principal face near the groove in the third area. The outward face of the coating resin film is a part of the appearance of the optical connecting device.

An optical processing apparatus according to an embodiment includes: (a) an optical connecting device; and (b) a silicon photonics device mounting the optical connecting device so as to be optically coupled to the optical connecting device. The optical connecting device according to an embodiment includes: a holder; an optical fiber supported by the holder; and a guide part supported by the holder, the holder including a first resin body, a second resin body, a supporting part, and a first lid part, the supporting part having a principal surface, and a groove extending in a direction of a first axis on the principal surface, the groove having a first face and a second face, the first resin body being disposed in contact with the optical fiber between the supporting part and the first lid part, the guide part being supported in the groove by the first face and the second face, the second resin body bonding the guide part to the supporting part, the optical fiber extending in the direction of the first axis on the principal surface of the supporting part, and the first lid part being disposed apart from the guide part on the optical fiber, the optical fiber being between the principal surface of the supporting part and a principal surface of the first lid part.

The optical processing apparatus can combine a silicon photonic device with the optical connecting device of excellent heat resistance. The optical connecting device is connectable to an external optical connector by passive alignment, and this passive alignment can couple the external optical connector with the silicon photonics device through the optical connecting device, which allows the external optical connector to be free from a heat resistance needed for the optical connecting device according to the present embodiment.

The optical processing apparatus according to an embodiment, further includes: a semiconductor device electrically connected to the silicon photonics device; and a circuit board mounting the semiconductor device and the silicon photonics device, the semiconductor device being bonded to the silicon photonics device with a solder.

The optical processing device is provided with the optical connecting device that withstands heat treatment for solder reflow subjected thereto.

A method for fabricating an optical connecting device according to an embodiment includes: (a) preparing a supporting part including a groove with a first face and a second face, the first face and the second face extending in a direction of a first axis; (b) placing an optical fiber and a first resin on a principal surface of the supporting part; (c) placing a first lid part on the first resin and the optical fiber outside the groove; (d) curing the first resin after the first lid part is placed; (e) placing a second resin and a guide part on the principal surface of the supporting part; and (f) curing the second resin after the second resin and the guide part are placed. The first lid part is pressed in curing the first resin, and the guide part is supported by the first face and second face of the groove in curing the second resin.

In the method for fabricating the optical connecting device, the first lid part is placed on the supporting part so as to avoid the guide part, and does not cover the guide part. The first lid part thus placed allows each of the first lid part and the guide part to be independent from the other in residual stresses that may be produced in the first lid part and the guide part in curing each of the first and second resins. This independence can provide the optical connecting device with an excellent heat resistance.

The method according to an embodiment further includes, prior to curing the second resin, placing a second lid part apart from the optical fiber on the second resin and the guide part, the second lid part being apart from the first lid part, and the second lid part being pressed in curing the second resin.

In the method for fabricating the optical connecting device, the first lid part is separated from the second lid part, and this separation allows the first lid part and the guide part to be independent from respective residual stresses that may be left in the first lid part and the guide part in curing each of the first and second resins.

In the method according to an embodiment, the guide part is pressed in curing the second resin. The method further includes, after curing the second resin, supplying additional resin onto the guide part, the additional resin being apart from the first lid part; and curing the additional resin.

The method for fabricating the optical connecting device allows direct pressing of the guide part in curing the second resin. An additional resin is supplied away from the first lid part and then is cured, and the additional resin thus supplied and cured can make each of these resins and the guide part independent from the other in residual stresses that may be produced in the resins and the guide part in curing the second resin and the additional resin.

In the method according to an embodiment, the curing of the first resin and the curing of the second resin are carried out in a single curing process, and the first lid part and the guide part are pressed with a single pressing tool.

The method for fabricating the optical connecting device allows a single jig to regulate pressing force to the first lid part and the guide part.

A method for fabricating an optical processing apparatus according to an embodiment includes: (a) preparing an assembly including an optical connecting device and a silicon photonics device mounting the optical connecting device; (b) disposing a semiconductor device and the silicon photonics device of the assembly on a circuit board; and (c) after disposing the semiconductor device and the silicon photonics device, applying a thermal process for solder reflow to the circuit board. The optical connecting device according to an embodiment includes: a holder; an optical fiber supported by the holder; and a guide part supported by the holder, the holder including a first resin body, a second resin body, a supporting part, and a first lid part, the supporting part having a principal surface, and a groove extending in a direction of a first axis on the principal surface, the groove having a first face and a second face, the first resin body being disposed in contact with the optical fiber between the supporting part and the first lid part, the guide part being supported in the groove by the first face and the second face, the second resin body bonding the guide part to the supporting part, the optical fiber extending in the direction of the first axis on the principal surface of the supporting part, and the first lid part being disposed apart from the guide part on the optical fiber, the optical fiber being between the principal surface of the supporting part and a principal surface of the first lid part.

The optical processing apparatus, which is fabricated through heat treatment for solder reflow, still keeps the optical coupling between the optical connecting and silicon photonics devices that is achieved prior to the heat treatment. This optical coupling is brought by the optical connecting device with excellent heat resistance which has already been subjected to the heat treatment for solder reflow in the fabricating process.

Teachings of the present invention can be readily understood by considering the following detailed description with reference to the accompanying drawings shown as examples. Referring to the accompanying drawings, an optical connecting device, an optical processing apparatus, a method for fabricating an optical connecting device, and a method for fabricating an optical processing apparatus according to the present embodiments will be described below. To facilitate understanding, identical reference numerals are used, where possible, to designate identical elements that are common to the figures.

Figure 1B:
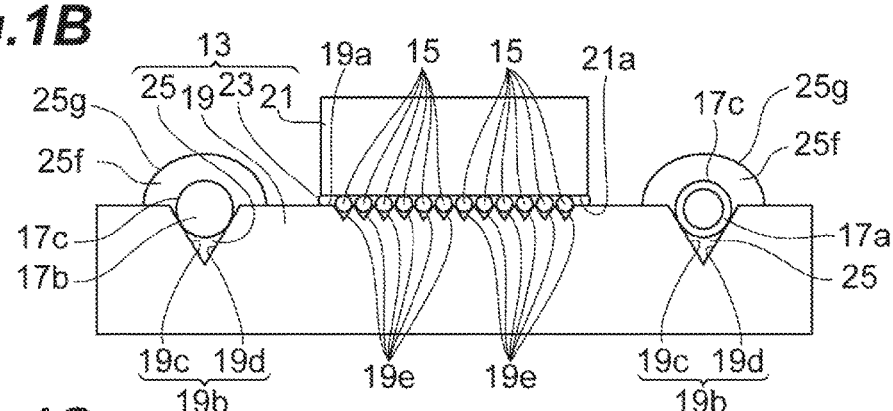
FIG. 1B is a front elevational view showing the optical connecting device according to the present embodiment.
Figure 1C:
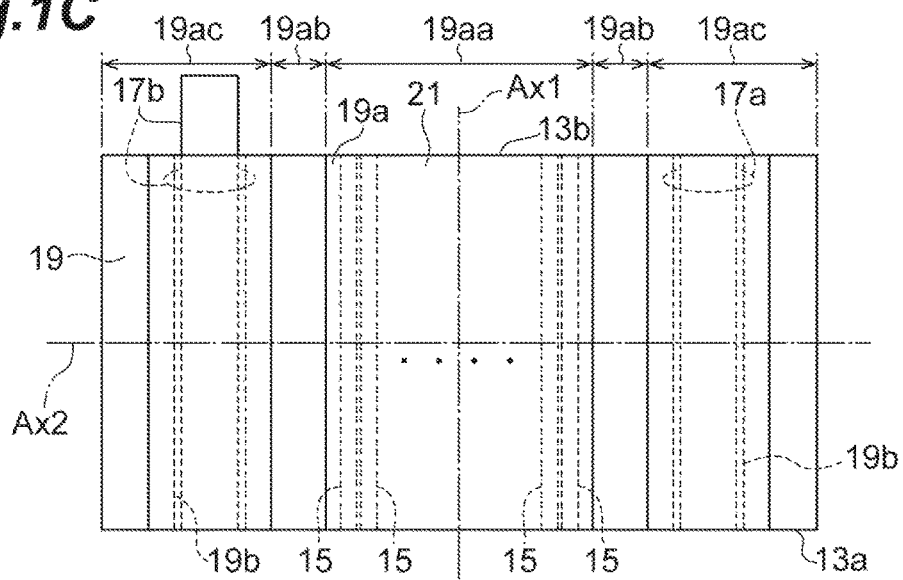
FIG. 1C is a plan view showing the optical connecting device according to the present embodiment.

FIGS. 1A, 1B, 1C, 2A, 2B, and 2C are schematic views each showing an optical connecting device according to the present embodiment. The optical connecting device 11 (11a, 11b) will be described with reference to FIGS. 1A to 2C. FIG. 1A is a partial cutaway perspective view showing an outward form of an optical connecting device 11a; FIG. 1B is a front elevational view showing the end face for optical coupling of the optical connecting device 11a: and, FIG. 1C is a plan view of the top face of the optical connecting device 11a. FIG. 2A is a partial cutaway perspective view showing the outward form of the optical connecting device 11b; FIG. 2B is a front elevational view showing the end face for optical coupling of the optical connecting device 11b, and FIG. 2C is a plan view showing the top face of the optical connecting device 11b. With reference to FIGS. 1A to 2C, the optical connecting device 11 (11a and 11b) will be described below.

Referring to FIGS. 1A to 2C, the optical connecting device 11 (11a and 11b) includes a holder 13, one or more optical fibers 15 and a guide part 17 (17a and 17b). The optical fibers 15 and the guide part 17 (17a and 17b) are supported by the holder 13. The holder 13 includes a supporting part 19 and a first lid part 21. The supporting part 19 has a principal surface 19a and a groove 19b. The groove 19b extends in the direction of the first axis Ax1 on the principal surface 19a. The groove 19b has a first face 19c and a second face 19d which extend in the direction of the first axis Ax1, and may be, for example, a V-shaped groove, but is not limited thereto. The guide part 17 is supported by the first and second faces 19c and 19d in the groove 19b. The first lid part 21 is disposed on the optical fibers 15 so as to cover the optical fibers 15 away from the guide part 17. The optical fibers 15 extend in the direction of the first axis Ax1 on the principal face 19a of the supporting part 19. In the present embodiment, the supporting part 19 has support grooves 19e extending in the direction of the first axis Ax1 on the principal face 19a. Each of the supporting grooves 19e has a first face 19f and a second face 19g, and may be, for example, a V-shaped groove, but is not limited thereto. The supporting grooves 19e, which are prepared for positioning of the optical fibers 15, are arranged on not the first lid part 21 but the supporting part 19, such that the supporting grooves 19e of the support part 19 can be positioned with respect to the groove 19b.

The holder 13 includes a first resin body 23 and a second resin body 25. The first resin body 23 is disposed between the supporting part 19 and the first lid part 21 to bond the support part 19 and the first lid part 21 to each other, so that the optical fibers 15, the supporting part 19, and the first lid part 21 are secured to each other. The optical fibers 15 are arrayed between the principal face 21a of the first lid part 21 and the principal face 19a of the support part 19, specifically, between the principal face 21a and the support grooves 19e, and are positioned with respect to the supporting part 19. The second resin body 25 secures the guide part 17 to the supporting part 19. Specifically, the second resin body 25 is provided between the guide part 17 and the support parting 19 in the groove 19b to secure the guide part 17 to the supporting part 19.

The holder 13 has a first end face 13a and a second end face 13b, and the first end face 13a is opposite to the second end face 13b. The first and second end faces 13a and 13b extend in a direction intersecting that of the first axis Ax1. The optical fibers 15 extend from the first end face 13a in the direction from the first end face 13a to the second end face 13b. In the present embodiment, the guide part 17 (17a) terminates at the second end face 13b. The guide part 17

(17a and 17b) also extends from the first end face 13a in the direction from the first end face 13a to the second end face 13b, and terminates at the second end face 13b in the present embodiment. The guide part 17 (17a and 17b) can include, for example, a pipe-shaped guide pipe 17a (a tube) or a rod-shaped guide rod 17b.

The optical connecting device 11 (11a and 11b) includes the optical fibers 15, which are arranged between the support part 19 and the principal face 21a of the first lid part 21, and separates the first lid part 21 from the guide part 17 supported by the first and second faces 19c and 19d of the groove 19 b. The guide part 17 is made of material different from materials of the supporting part 19 and the first lid part 21, and the guide part 17 has a thermal expansion coefficient different from thermal expansion coefficients of the supporting part 19 and the first lid part 21. Separating the first lid part 21 from the guide part 17 can prevent the deformation of the guide part 17, which is caused by temperature change, from transferring to the first lid part 21 fixing the optical fiber 15.

As shown in FIGS. 1A and 2A, in the present embodiment, the number of the grooves 19b in the supporting part 19 is two. In the optical connecting device 11 (11a and 11b), the guide pipe 17a is disposed in one of the grooves 19b of the support part 19, and the guide rod 17b (pin) is disposed in the other of the grooves 19 b. In the optical connecting device 11 (11a and 11b), the guide pipe 17a may be, however, disposed in each of the grooves 19b, and alternatively the guide rod 17b may be disposed in each of the grooves 19b.

The first resin body 23 may be separated from the second resin body 25. In the optical connecting device 11 (11a and 11b), the guide rod 17b protrudes from the second end face 13b of the holder 13, and the protrusion allows the insertion of the protruding guide rod 17b into the guide hole of an optical connector to be coupled to the optical connecting device 11 (11a and 11b). The guide pipe 17a is provided with a guide hole that can receive the guide pin of an optical connector to be coupled to the optical connecting device 11 (11a and 11b).

The principal face 19a of the support part 19 includes a first area 19aa, a second area 19ab, and a third area 19ac. The first area 19aa, the second area 19ab, and the third area 19ac are arranged in the direction of the second axis Ax2, which intersects the direction of the first axis Ax1. The second area 19ab is disposed between the first area 19aa and the third area 19ac. The first area 19aa makes contact with the first resin body 23, and supports the optical fibers 15 so as to be arranged in the direction of the second axis Ax2. The second area 19ab is disposed between the first area 19aa and the groove 19b. The third area 19ac includes the groove 19b.

First, the optical connecting device 11a shown in FIGS. 1A to 1C will be described below. The second resin body 25 includes a coating resin film 25f separately from resin filled in the groove 19b. In the third area 19ac of the supporting part 19, the resin film 25f covers the guide part 17 in contact with the side face 17c thereof, the sides of the groove 19b, and both areas, adjoining the groove 19b on both sides thereof, of the principal face 19a, and extends along the side face 17c of the guide part 17 in a direction of from one of the first area 19aa and the third area 19ac to the other. The coating resin film 25f has a top face 25g extending from one of the first and third areas 19aa and 19ac to the other. The optical connecting device 11a has an outward appearance including the top face 25g of the coating resin film 25f.

Next, the optical connecting device 11b shown in FIGS. 2A to 2C will be described below. The holder 13 further includes a second lid part 29. The second lid part 29 is disposed on the guide part 17 (17a and 17b) away from the first lid part 21, and the guide part 17 (17a and 17b) is between the groove 19b of the supporting part 19 and the principal surface 29a of the second lid part 29, and the separation of the first lid part 21 from the second lid part 29 can prevent the thermal deformation of the guide part 17 from causing that of the first lid part 21. The second lid part 29 can protect the guide part 17.

The second resin body 25 includes a covering resin body 25h, which covers the guide part 17, separately from resin filled in the groove. The resin body 25h is disposed between the support part 19 and the second lid part 29 to bond the second lid part 29 to the supporting part 19, and works as an adhesive member. Specifically, the principal face 29a of the second lid part 29 is in direct contact with the side face 17c of the guide part 17, and the resin body 25h fixes the second lid part 29 to the support part 19. The second lid part 29 and the resin body 25h exert a fixing force on the guide part 17, and the fixing force arises from a pressing force applied thereto during the fabrication thereof.

An exemplary optical connecting device 11 (11a, 11b)

Holder 13

Supporting part 19: glass or ceramic, in particular, quartz, tempax, pyrex (registered trademark), alumina or zirconia First lid part 21: glass or ceramic, in particular, quartz, tempax, pyrex (registered trademark), alumina or zirconia.

Optical fiber 15: single mode quartz optical fiber

Guide part 17 (17a and 17b): metal, in particular, copper, nickel, iron, cobalt, tungsten or alloys containing a part or all of them.

First resin body 23: resin containing ultraviolet curing agent and/or heat curing agent, in particular, epoxy resin.

Second resin body 25: resin containing ultraviolet curing agent and/or heat curing agent, in particular, epoxy resin.

Second lid part 29: glass or ceramic, in particular, quartz, tempax, pyrex (registered trademark), alumina or zirconia.

Size of Support Part 19

Length in the direction of the first axis Ax1: 1 to 5 mm, for example, 3 mm.

Width in the direction of the second axis Ax2: 2 to 10 mm, for example 6 mm.

Thickness in the direction perpendicular to the plane defined by the first and second axes Ax1 and Ax2: 0.5 to 5 mm, for example, 1.5 mm.

Size of the First Lid Part 21

Length in the direction of the first axis Ax1: 1 to 5 mm, for example 3 mm.

Width in the direction of the second axis Ax2: 1 to 8 mm, for example, 4 mm.

Thickness in the direction perpendicular to the plane defined by the first and second axes Ax1 and Ax2: 0.5 to 5 mm, for example, 1 mm.

First resin body 23: resin containing ultraviolet curing agent and/or heat curing agent, in particular, epoxy resin.

Second resin body 25: resin containing ultraviolet curing agent and heat curing agent, in particular, epoxy resin.

Second lid part 29: glass or ceramic, in particular, quartz, tempax, pyrex (registered trademark), alumina or zirconia.

Size of Support Part 19

Length in the direction of the first axis Ax1: 1 to 5 mm, for example, 3 mm.

Width in the direction of the second axis Ax2: 2 to 10 mm, for example, 6 mm.

Thickness in the direction perpendicular to the plane defined by the first and second axes Ax1 and Ax2: 0.5 to 5 mm, for example, 1.5 mm.

Size of the First Lid Part 21

Length in the direction of the first axis Ax1: 1 to 5 mm, for example, 3 mm.

Width in the direction of the second axis Ax2: 1 to 8 mm, for example, 4 mm.

Thickness in the direction perpendicular to the plane defined by the first and second axes Ax1 and Ax2: 0.5 to 5 mm, for example, 1 mm.

FIGS. 3A, 3B, 3C, 3D, 3E, 4A, 4B, 4C, 5A, 5B, and 5C are schematic views each illustrating a major step in the method of making the optical connecting device. With reference to FIGS. 3A to 5C, fabricating an optical connecting device 11 (11 and 11b) will be described below. For ease of understanding, reference numerals used in the description of the completed optical connecting device are used in the following description.

Figure 3A:
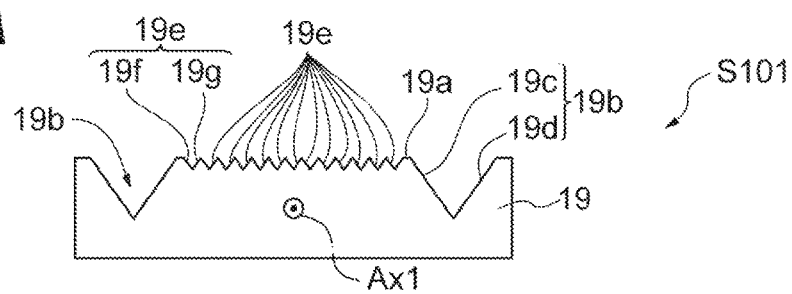
FIG. 3A is a schematic view showing a step for preparing a supporting base for an optical connecting device a method for fabricating the optical connecting device according to the present embodiment.

In step S101, a support parting 19 is prepared as shown in FIG. 3A. The support part 19 includes grooves 19b and supporting grooves 19e formed in the principal surface 19a. The grooves 19b each have a first face 19c and a second face 19d which extend in the direction of the first axis Ax1. The supporting grooves 19e each have a first face 19f and a second face 19g which extend in the direction of the first axis Ax1.

Figure 3B:
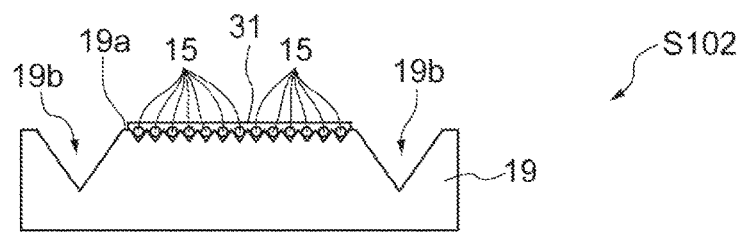
FIG. 3B is a schematic view showing a step for providing optical fibers and first resin on the supporting base in the method according to the present embodiment.

In step S102, as shown in FIG. 3B, the optical fibers 15 are prepared and then is arranged in the support grooves 19e. Either after this arrangement or prior to the arrangement, a first fluid resin 31 is supplied in the support groove 19e (by, specifically, coating or dripping) to provide the optical fibers 15 and the first resin 31 on the principal surface 19a of the support part 19. The first resin 31 may include an epoxy resin containing an ultraviolet curing agent and/or a thermal hardening agent.

Figure 3C:
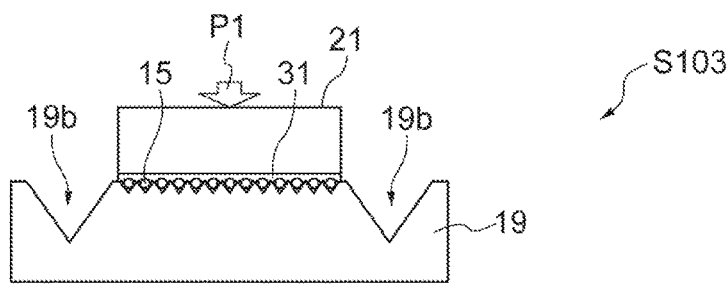
FIG. 3C is a schematic view showing a step for placing a first lid part on the optical fibers and the first resin without covering the grooves of the supporting base in the method for fabricating the optical connecting device according to the present embodiment.

In step S103, as shown in FIG. 3C, the first lid part 21 is disposed on the optical fibers 15 and the first resin 31 on the principal surface 19a except on the groove 18b of the support part 19, so that the optical fibers 15 and the first resin 31 are between the first lid part 21 and the supporting part 19. In order to spread the first resin 31 in the support groove 19e between the first lid part 21 and the supporting part 19 and between the optical fibers 15, a fastening force is applied to the first lid part 21 and the supporting part 19. Specifically, the first lid part 21 is pushed against the supporting part 19.

Figure 3D:
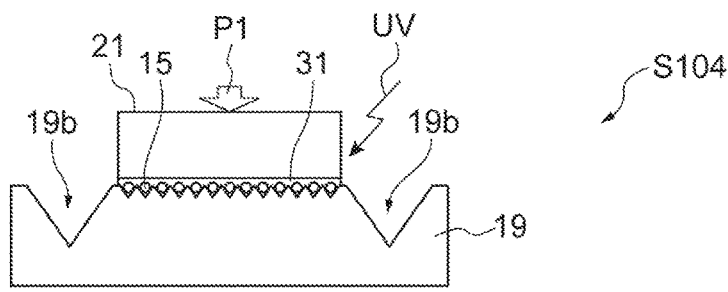
FIG. 3D is a schematic view showing a step for curing the first resin to form a first resin bogy in the method for fabricating the optical connecting device according to the present embodiment.

In step S104, as shown in FIG. 3D, the first lid part 21 is placed thereon, and the first resin 31 is cured while the pressing force P1 is applied to the first lid part 21, whereby the solidified first resin 31 (referred to as the first resin body 33) is obtained. The curing is performed by irradiating, for example, ultraviolet rays UV. If necessary, heating may be performed for thermal curing in a later step.

Figure 3E:
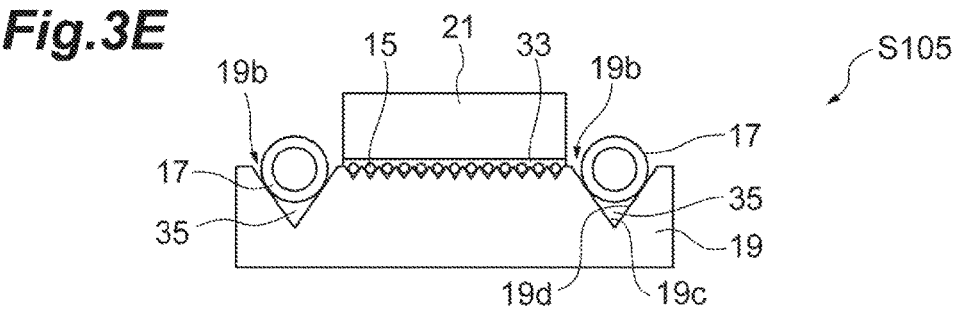
FIG. 3E is a schematic view showing a step for providing the grooves of the supporting base with guide parts and supplying second resin onto guide parts and the supporting base in the method for fabricating the optical connecting device according to the present embodiment.

In step S105, as shown in FIG. 3E, the guide part 17 is prepared, and the guide parts 17 are arranged in the respective grooves 19b of the support part 19. The guide parts 17 are supported on the first and second faces 19c and 19d of the grooves 19b. After the arrangement or prior to the arrangement, a fluid second resin 35 is supplied to the grooves 19b (specifically, by coating or dropping), and the guide parts 17 and the second resin 35 thus applied are in the grooves 19b of the principal surface 19a of the supporting part 19, whereby the support part 19 mounting the guide parts 17 and the second resin 35 on the principal surface 19a thereof. The second resin 35 thus supplied does not reach the first resin 31 or the first resin body 33. The second resin 35 may include an epoxy resin containing an ultraviolet curing agent and/or a heat curing agent.

In the manufacturing method, the first lid part 21 is placed on the support part 19 except on the guide part 17. The first lid part 21 thus placed allows the first lid part 21 and the guide part 17 to be independent from each other in that each of the first lid part 21 and the guide part 17 does not directly receive, from in the other of the first lid part 21 and the guide part 17, a potential residual stress which may be produced therein in curing the first resin 31 and the second resin 35. This independence can provide the optical connecting device 11 with excellent heat resistance.

First, the major steps in the method of manufacturing the optical connecting device 11a will be described in succession.

Figure 4A:
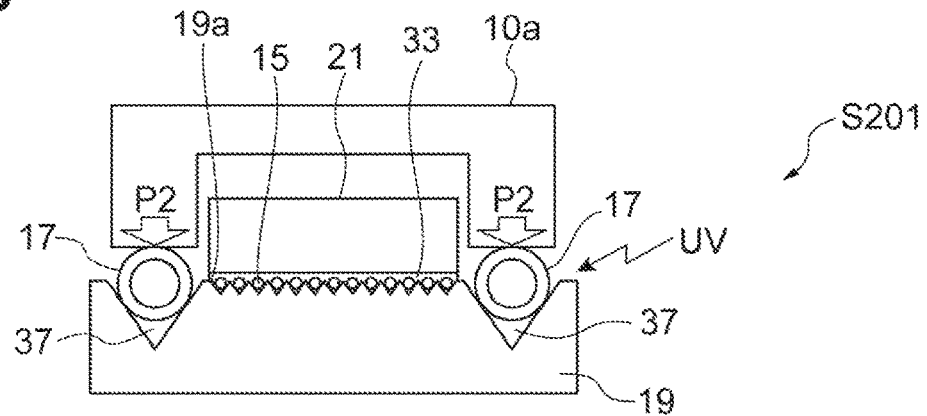
FIG. 4A is a schematic view showing a step for curing the second resin to form a second resin body in the method of fabricating the optical connecting device according to the present embodiment.

In step S201 which follows step S105, as shown in FIG. 4A, after arranging the guide part 17 and the second resin 35, the second resin 35 is cured to form a solidified second resin 35 (referred to as a second resin body 37). The guide part 17 is supported by the first and second faces 19c and 19d of the groove 19b in curing the second resin 35. The application of a fastening force to the guide part 17 and the support part 19 ensures this support in hardening the second resin 35. Specifically, it is preferable to press not the first lid part 21 but the guide part 17 against the supporting part 19 with the first tool 10a. The first tool 10a has two arms and a bridge connecting the arms so as to evenly press both the guide parts 17. Curing is performed by irradiating resin with, for example, ultraviolet rays UV. If necessary, heating for thermal curing may be carried out in a later step.

If necessary, the guide parts 17 can be fixed prior to fixing the optical fibers 15 and the first lid part 21.

Figure 4B:
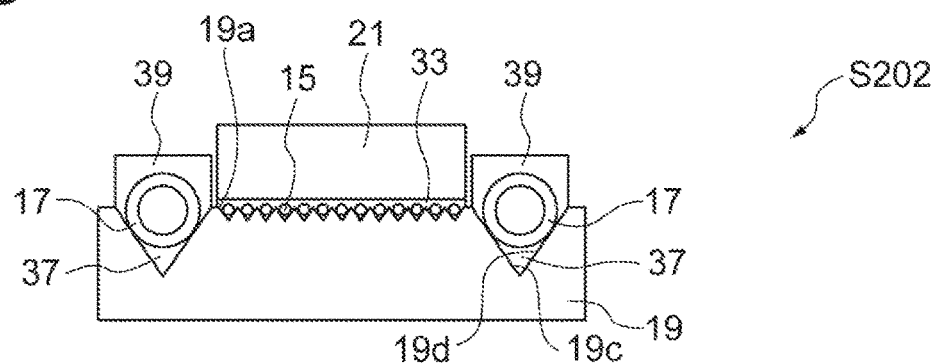
FIG. 4B is a schematic view showing a step for supply additional resin onto the guide parts and the supporting base in the method of fabricating the optical connecting device according to the present embodiment.

Further, if necessary, in step S202, as shown in FIG. 4B, after forming the second resin body 37, an additional resin 39 may be supplied to be disposed on the guide part 17 separately from the first lid part 21. The additional resin 39 can include an epoxy resin containing an ultraviolet curing agent and/or a thermal curing agent.

Figure 4C:
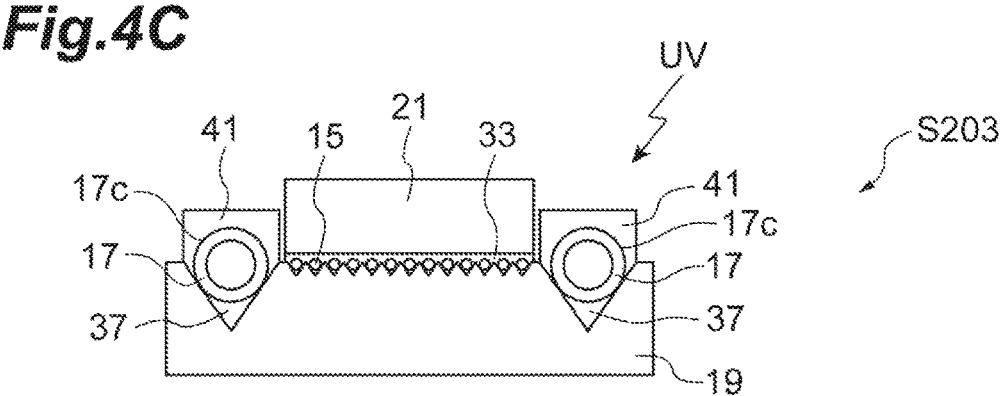
FIG. 4C is a schematic view showing a step for curing the additional resin to form the additional resin body in the method of fabricating the optical connecting device according to the present embodiment.

In step S203, as shown in FIG. 4C, the additional resin 39 is cured to form the additional resin body 41. The second resin body 37 fixes the guide part 17 to the groove 19b, and the additional resin 39 covers the side face 17c of the guide part 17 to cap the guide part 17 at the upper side thereof, so that the additional resin body 41 secures the guide part 17 to the support part 19. Curing is performed by irradiating resin with, for example, ultraviolet rays UV. If necessary, heating for thermal curing may be performed in a later step. The above steps bring the optical connecting device 11a to completion to produce a product therefor.

The method of fabricating the optical connecting device 11a directly presses the guide part 17 in curing the second resin 35. The additional resin 39 is supplied apart from the first lid part 21 and then is cured, and the additional resin 39 thus cured can avoid directly exerting, on the first lid part 21, residual stresses that may remain in the additional resin 39 and the guide part 17 in curing the second resin 35 and the additional resin 39.

If necessary, the product may be polished to form the optical coupling end face of the optical connecting device 11a.

Next, the major steps in the method of fabricating the optical connecting device 11b will be described below.

In step S301 which follows step S105, as shown in FIG. 5A, prior to curing the second resin 35, the additional resin 43 is placed on the guide part 17 apart from the first lid part 21, and the second lid part 29 is placed on the guide part 17 and the second resin 35 so as not to cover the optical fibers 15. Accordingly, the second lid part 29 is spaced from the optical fibers 15. The additional resin 43 may include, for example, an epoxy resin containing an ultraviolet curing agent and/or a heat curing agent. In order to position the guide part 17 to the groove 19b, it is preferable to perform the pressing P3 to the second lid part 29 before making the second resin 35 and the additional resin 43 cured.

In step S302, as shown in FIG. 5B, the application of a tightening force to both the second lid parts 29 and the supporting part 19 can ensure the positioning of the guide part 17 during the process for curing the second resin 35 and the additional resin 43. Specifically, it is preferable to use the second tool 10b to apply the pressing force P3 to not the first lid part 21 but to these second lid parts 29 and the supporting part 19. The second tool 10b has two arms and a bridge connecting the arms, so that the two second lid parts 29 can be pressed equally. Curing is performed by irradiating resin with, for example, ultraviolet rays UV. This curing can produce the second resin body 37 and the additional resin body 45 from the second resin 35 and the additional resin 43, respectively. The second resin body 37 and the additional resin body 45 firmly fix the guide parts 17 to the grooves 19b of the support part 19, and the additional resin body 45 can press the guide parts 17 against the support part 19. If necessary, heating may be performed for thermal curing in a later step.

In the method of fabricating the optical connecting device 11b, spacing the first lid part 21 from the second lid part 29 covering the guide part 17 can make each of respective stresses, which may be produced in curing the second resin 35 and the additional resin 43 and left in the first lid part 21 and the guide part 17, independent from the other.

The above steps bring the optical connecting device 11b to completion to produce a product therefor. If necessary, this product may be polished to provide the optical connecting device 11b with an polished optical coupling end face.

If necessary, as shown in FIG. 5C, curing the first resin 31 and curing of the second resin 35 may be performed simultaneously by a single treatment (for example, ultraviolet irradiation). In this curing process, the first and second lid parts 21 and 29 are pressed by a single third tool 10c. The single tool can define a pressing force of the first and second lid parts 21 and 29. The third tool 10c has as an exemplary shape, which can be designed according to the shapes of the first and second lid parts 21 and 29. The first resin 31, the second resin 35, and the additional resin 43 can be supplied to form the first resin body 33, the second resin body 37, and the additional resin body 45, respectively. If necessary, heating may be performed for thermal curing in a later step.

In the fabrication of the optical connecting device 11a, curing of the first resin 31 and curing of the second resin 35 may be performed simultaneously by a single process (for example, ultraviolet irradiation). In this curing process, the first lid part 21 and the guide part 17 are also pressed with a single tool.

The above steps bring a stub-type optical connecting device 11 to completion.

Figure 6A:
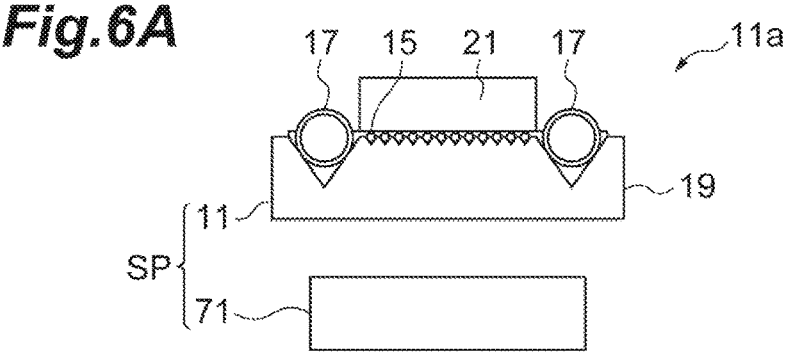
FIG. 6A is a schematic view showing a step for preparing an optical connecting device thus fabricated in a method for fabricating an assembly for the optical processing apparatus according to the present embodiment.

FIGS. 6A, 6B, 6C, and 6D are schematic views each showing a major step in a method of fabricating an assembly for an optical processing apparatus. As shown in FIG. 6A, for example, an optical connecting device 11a is prepared, and a semiconductor device 71 is prepared which includes an optical coupling element. The semiconductor device 71 may include a semiconductor optical device such as a silicon photonics device. The optical connecting device 11a and the semiconductor device 71 are referred to as a part SP.

Figure 6B:
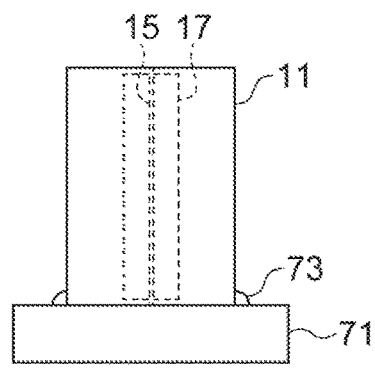
FIG. 6B is a schematic view showing a step for mounting the optical connecting device and resin on a semiconductor device with the resin disposed between the optical connecting device and the semiconductor device in the method for fabricating the assembly according to the present embodiment.

As shown in FIG. 6B, the optical connecting device 11a is mounted on the semiconductor device 71 so as to be optically coupled to the optical coupling element of the semiconductor device 71. Further, a resin 73 is supplied to the semiconductor device 71.

Figure 6C:
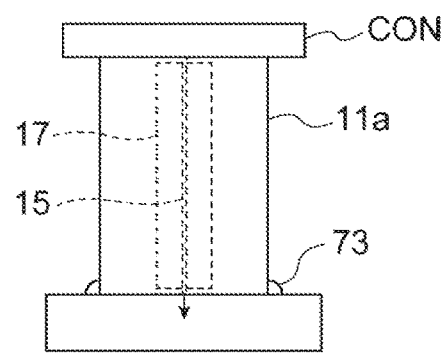
FIG. 6C is a schematic view showing a step for align the optical connecting device, which is mated with an optical connector, with the semiconductor device by active alignment and in the method for fabricating the assembly according to the present embodiment.

As shown in FIG. 6C, the optical connector CON is connected to the optical connecting device 11a for active optical alignment using light. Active optical alignment is performed to position the optical connecting device 11a with respect to the semiconductor device 71.

As shown in FIG. 6C, after the active optical alignment is completed, the resin 73 is cured to bond the optical connecting device 11a to the semiconductor device 71. Curing of the resin can be, for example, thermosetting and/or ultraviolet curing. The temperature of heat treatment in thermal curing is, for example, in the range of 80 to 200 degrees Celsius, for example, at the temperature of 120 degrees.

Figure 6D:
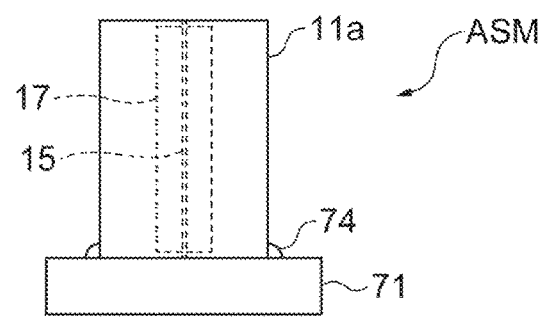
FIG. 6D is a schematic view showing a step for curing the resin and releasing the optical connector from the optical connecting device from the connection in the method for fabricating the assembly according to the present embodiment.

After the cured resin 73 (resin body 74) is obtained, as shown in FIG. 6D, the optical connector CON is detached from the optical connecting device 11a to fabricate an assembly ASM. The assembly ASM thus formed includes the semiconductor device 71 and the optical connecting device 11a, which has been optically coupled to the semiconductor device 71.

FIGS. 7A and 7B are views each showing an exemplary silicon photonics device applicable to the optical processing apparatus according to the present embodiment. FIG. 7A is a plan view showing a silicon photonics semiconductor device. FIG. 7B is a cross-sectional view, taken along line VIIb-VIIb shown in FIG. 7A, showing the silicon photonic device. Referring to FIG. 7A, the silicon photonics device SPD includes optical coupling elements, such as grating couplers, GC0, GC1, GC2, GC3, GC4, GC5, GC6, GC7, GC8, CG9, CG10, and GC11 acting as optical coupling elements. In the present embodiment, the grating couplers GC1 to CG4 are prepared for the optical receiver.

Light signals from the grating couplers GC1 to CG4 are supplied to the light receiving elements PD via the optical circuit WC. In the present embodiment, the optical circuit WC includes the optical waveguides WG1 to WG4. Specifically, the grating couplers GC1 to CG4 are optically coupled to the photodiodes PD1 to PD4 through the optical waveguides WG1 to WG4, respectively. The photodiodes PD1 to PD4 are connected to an electric circuit TIA (for example, a transimpedance amplifier) via conductive lines EL1 to EL4. The electric circuit TIA performs processing (for example, current-voltage conversion, amplification) of electric signals (for example, photocurrent) from the photodiodes PD1 to PD4 to produce electric signals from the received light signals.

In addition, the grating couplers GC6 to CG10 are prepared for the optical transmitter. In the present embodiment, the laser light beam from the grating coupler GC6 is supplied to an optical modulator MD. The optical modulator MD includes, for example, multiple Mach-Zehnder modulators MZIA, MZIB, MZIC, and MZID. The Mach-Zehnder modulators MZIA, MZIB, MZIC and MZID receive the electric signals EM1 to EM4 from the drive circuit Driver, respectively, to produce multiple modulated light beams from the laser light beam with the electric signals EM1 to EM4. These modulated light beams propagate through the optical waveguides WG7 to WG10 to the grating couplers GC7 to CG10, respectively.

The silicon photonics device SIPHD includes a first portion 71a, a second portion 71b, and a third portion 71c, which are arranged in the direction of the device axis Dx.

The first portion 71a includes an arrangement of grating couplers GC0 to CG11, which are arranged along one edge in the first portion 71a. The second portion 71b includes optical elements, such as a semiconductor light receiving element and an optical modulator. The third portion 71c includes an electric circuit, such as an electric circuit TIA and a drive circuit DVR. As seen from the above, the grating couplers, the semiconductor light receiving elements, the optical modulators, and the electric circuits are monolithically integrated to form the silicon photonics device.

Referring to FIG. 7B, in the silicon photonic device SIPHD, the grating couplers GC0 to CG11 are connected to the optical waveguide WG.

Figure 8A:
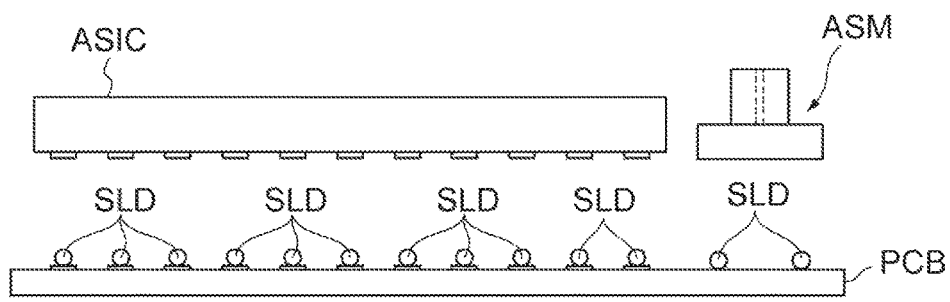
FIG. 8A is a schematic view showing a step for preparing a semiconductor ASIC device, the assembly, a circuit board in a method for fabricating an optical processing apparatus according to the present embodiment.
Figure 8B:
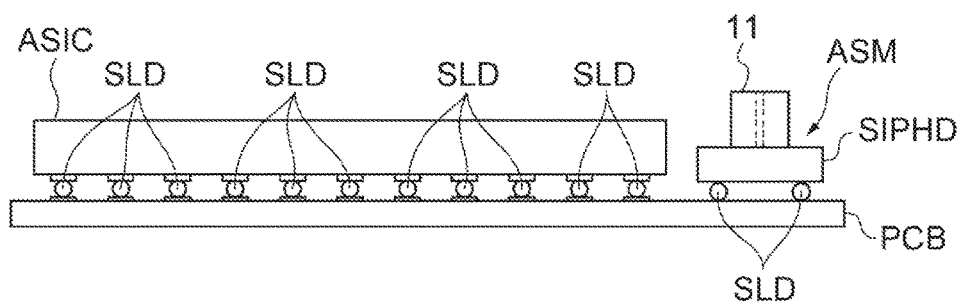
FIG. 8B is a schematic view showing a step for arranging the semiconductor ASIC device and the assembly on the circuit board in the method for fabricating the optical processing apparatus according to the present embodiment.
Figure 8C:
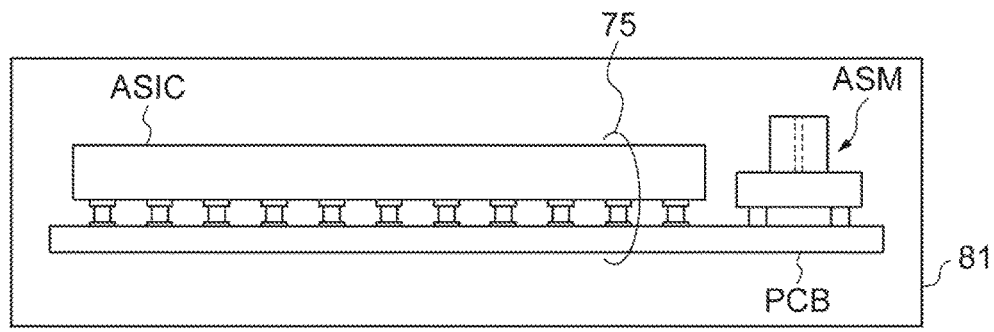
FIG. 8C is a schematic view showing a step for carry out thermal treatment for solder reflow in the method for fabricating the optical processing apparatus according to the present embodiment.

FIGS. 8A, 8B, and 8C are schematic views each showing a major step in a method for fabricating an optical processing apparatus. As shown in FIGS. 6A, 6B and 6C, the assembly ASM is prepared which includes the optical connecting device 11, and the optical connecting device 11 is mounted on the silicon photonics device SIPHD. Specifically, as shown in FIG. 8A, a surface-mountable semiconductor integrated device ASIC, and a circuit board PCB, such as a printed circuit board are prepared in addition to the assembly ASM. The semiconductor integrated device ASIC includes an integrated circuit that processes high-speed large-capacity data. The circuit board PCB includes solder members SLD disposed on the principal surface thereof.

As shown in FIG. 8B, the semiconductor integrated device ASIC and the silicon photonics device SIPHD of the assembly ASM are aligned with the circuit board PCB to form an arrangement of the semiconductor integrated device ASIC and the assembly ASM on the circuit board PCB.

As shown in FIG. 8C, the silicon photonics device SIPHD and the semiconductor integrated device ASIC are arranged on the circuit board PCB to form a product including the circuit board PCB that mounts the semiconductor integrated device ASIC and the assembly ASM including the optical connecting device 11 and the silicon photonics device SIPHD optically aligned, and the product is disposed in a reflow device 81. The reflow device 81 performs heat treatment for solder reflow.

The assembly ASM is subjected to the heat treatment for solder reflow. The temperature of this heat treatment is, for example, in the range of 200 to 270 degrees Celsius. The reflow process performs heating a board with solder paste or ball-shaped solders along, such as a printed circuit board PCB with electric parts thereon, in a furnace at a temperature of not less than the melting temperature of solder to solder them. The assembly ASM is also subjected to the heat treatment in the reflow process in the reflow device 81, thereby fabricating the optical processing apparatus 75. The optical connecting device 11 with excellent heat resistance allows the optical processing apparatus 75 to withstand heat treatment for solder reflow, so that the optical processing device 75 thus fabricated keeps optical alignment between the optical connecting device 11 and the silicon photonics device SIPHD. In operation of the optical processing apparatus 75, the optical connecting device 11 is subjected to a temperature is the range of, for example, 40 to 100 degrees Celsius, for example, at a temperature of 100 degrees Celsius, because of heat generation of the semiconductor device 71.

After this reflow, the optical processing apparatus 75 is completed.

Figure 9A:
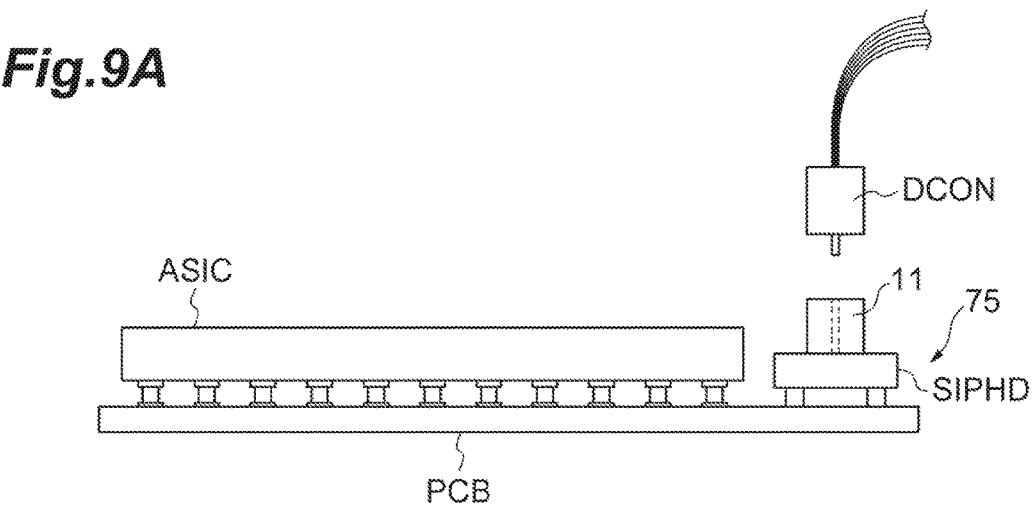
FIG. 9A is a schematic view showing the optical processing apparatus including the optical connecting device to be connected to an optical connector with guide pins to according to the present embodiment.
Figure 9B:
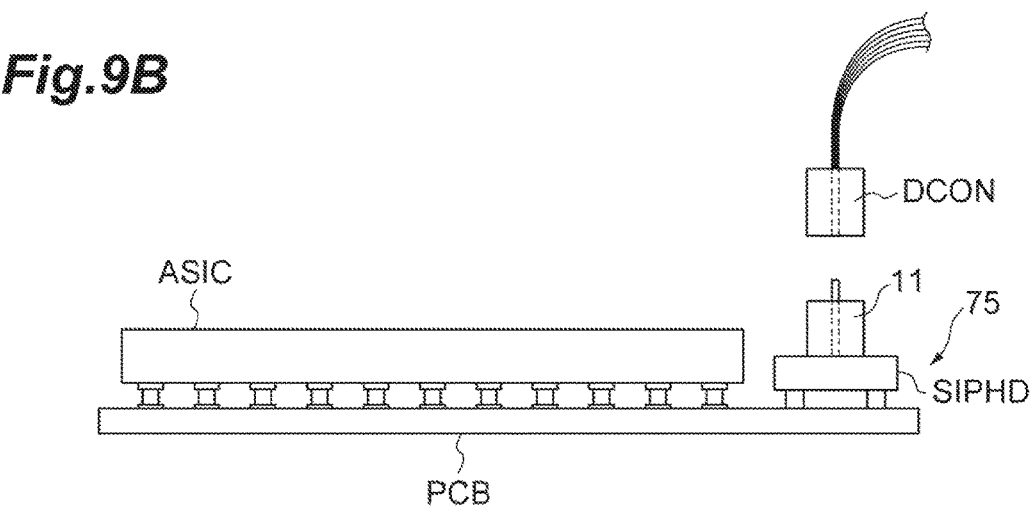
FIG. 9B is a schematic view showing the optical processing apparatus including the optical connecting device to be connected to an optical connector with guide pipes to according to the present embodiment.
Figure 9C:
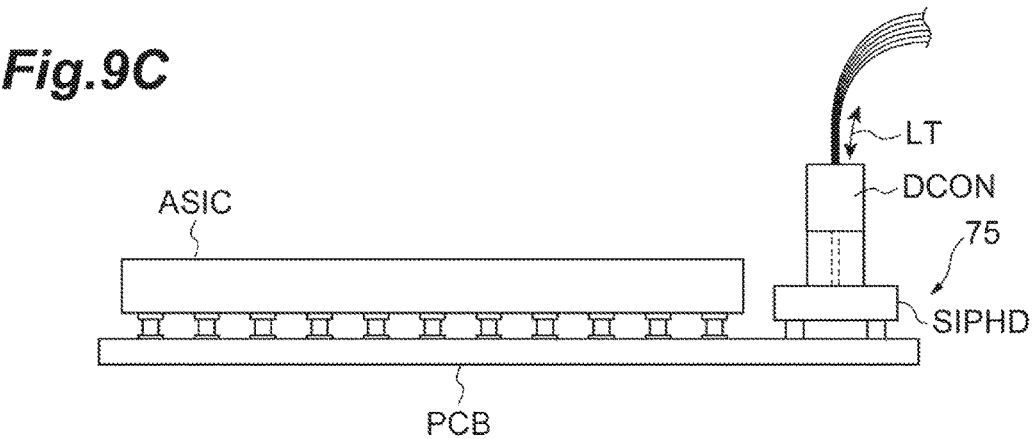
FIG. 9C is a schematic view showing the optical processing apparatus, which is optically connected to the optical connector, according to the present embodiment.

In the optical processing apparatus 75 shown in FIG. 9A, an external optical connector DCON having a guide pin is connected to the optical connecting device 11 including the guide pipe 17a. Alternatively, in the optical processing apparatus 75 shown in FIG. 9B, an external optical connector DCON having a guide pipe is connected to the optical connecting device 11 including the guide rod 17b. As shown in FIG. 9C, each of the above optical processing apparatuses 75 can receive and transmit the optical signal LT through the optical connecting device 11.

The optical connecting device 11 with excellent heat resistance can be combined with the silicon photonic device SIPHD to obtain the optical processing apparatus 75. The optical connecting device 11 can be connected to the external optical connector DCON by passive alignment, and this optical connector DCOM is coupled to the silicon photonics device SIPHD via the optical connecting device 11. In the optical processing device 75, the optical connecting device 11 withstands heat treatment for solder reflow.

As described above, the present embodiment can provide the optical connecting device having a structure that can withstand the heat treatment of solder reflow. The present embodiment can also provide the optical connecting apparatus including the above optical connecting device. The present embodiment can further provide a method for fabricating the optical connecting device, and a method for fabricating the optical connecting device.

Having described and illustrated the principle of the invention in a preferred embodiment thereof, it is appreciated by those having skill in the art that the invention can be modified in arrangement and detail without departing from such principles. We therefore claim all modifications and variations coining within the spirit and scope of the following claims.

What is claimed is:
1. An optical connecting device comprising:
a holder;
an optical fiber supported by the holder; and
a guide part supported by the holder,
the holder including a first resin body, a second resin body, a supporting part, and a first lid part,
the supporting part having a first end face, a second end face, a principal surface, a groove extending in a direction of a first axis on the principal surface, and a supporting groove extending from the first end face to the second end face in the direction of the first axis in the principle surface of the supporting part, the first end face and the second end face being arranged in the direction of the first axis with the first end face being opposite to the second end face, the groove having a first face and a second face,
the first resin body being disposed in contact with the optical fiber between the supporting part and the first lid part,
the supporting part, the optical fiber, and the first lid part being arranged in order in a direction normal to the principal surface of the supporting part,
the guide part being supported in the groove by the first face and the second face, the second resin body bonding the guide part to the supporting part,
the first resin body being apart from the second resin body,
the optical fiber extending in the direction of the first axis in the supporting groove in the principal surface of the supporting part, and
the first lid part being disposed apart from the guide part on the optical fiber, the optical fiber being sandwiched between the principal surface of the supporting part and a principal surface of the first lid part.

2. The optical connecting device according to claim 1, wherein the guide part includes one of a pin and a pipe each having a side face extending in the direction of the first axis.

3. The optical connecting device according to claim 1, wherein
the holder includes a second lid part, and
the second lid part is disposed apart from the first lid part on the guide part, and the guide part is disposed between the groove of the supporting part and a principal surface of the second lid part.

4. The optical connecting device according to claim 1, wherein
the principal surface of the supporting part has a first area, a second area, and a third area, the first area being in contact with the first resin body and supporting the optical fiber, the second area being between the first area and the groove, the first area, the second area and the third area being arranged in a direction of a second axis intersecting with the first axis, and the second area being between the first area and the third area, and
the second resin body includes a coating film, the coating film being in contact with the third area of the supporting part and a side face of the guide part, and extending along the side face of the guide part in a direction from one of the first area and the third area to another of the first area and the third area.

5. The optical connecting, device according to claim 1, wherein the optical fiber extends from the first end face to the second end face in the supporting groove.

6. The optical connecting device according to claim 5, wherein
the first lid part extends from the first end face to the second end face on the supporting groove and on the optical fiber and on the principal surface of the supporting part, and
the first lid part is in contact with the optical fiber and the first resin body.

7. The optical connecting device according to claim 1, wherein
the principal face of the supporting part has a first area, a second area, and a third area,
the first area, the second area, and the third area are arranged in a direction of a second axis intersecting the first axis,
the second area separates the first area from the third area,
the first area includes the supporting groove,
the third area includes the groove,
the first resin body makes contact with the first area within the first area, and
the second resin body makes contact with the third area within the third area.

8. The optical connecting device according to claim 7, wherein the second area of the principal surface of the supporting part appears on an outward surface of the optical connecting device.

9. The optical connecting device according to claim 1, wherein the first lid part appears on an outward surface of the optical connecting device.

10. An optical processing apparatus comprising:
an optical connecting device; and
a silicon photonics device mounting the optical connecting device so as to be optically coupled to the optical connecting device,
the optical connecting device including a holder, an optical fiber supported by the holder, and a guide part supported by the holder,
the holder including a first resin body, a second resin body, a supporting part, and a first lid part,
the supporting part having a first end face, a second end face, a principal surface, a groove extending in a direction of a first axis on the principal surface, and a supporting groove extending from the first end face to the second end face in the direction of the first axis in the principal surface of the supporting part, the first end face and the second end face being arranged in the direction of the first axis, with the first end face being opposite to the second end face, the groove having a first face and a second face,
the first resin body being disposed in contact with the optical fiber between the supporting part and the first lid part,
the supporting part, the optical fiber, and first lid part being arranged in order in a direction normal to the principal surface of the supporting part,
the guide part being supported in the groove by the first face and the second face, the second resin body bonding the guide part to the supporting part,
the first resin body being apart from the second resin body,
the optical fiber extending in the direction of the first axis in the supporting groove in the principal surface of the supporting part,
the first lid part being disposed apart from the guide part on the optical fiber, the optical fiber being sandwiched between the principal surface of the supporting part and a principal surface of the first lid part,
the principal surface of the support part having a first area, a second area, and a third area,
the first area, the second area, and the third area being arranged in a direction of a second axis intersecting the first axis
the second area separating the first area from the third area,
the first area including the supporting groove,
the third area including the groove,
the first resin body making contact with the first area within the first area, and
the second resin body making contact with the third area within the third area.

11. The optical processing apparatus according to claim 10, further comprising:
a semiconductor device electrically connected to the silicon photonics device; and
a circuit board mounting the semiconductor device and the silicon photonics device,
wherein the semiconductor device is bonded to the silicon photonics device by soldering.

12. The optical connecting device according to claim 10, wherein the optical fiber extends from the first end face to the second end face in the supporting groove.

13. The optical connecting device according to claim 10, wherein
the first lid part extends from the first end face to the second end face on the supporting groove and on the optical fiber and on the principal surface of the supporting part, and
the first lid part is in contact with the optical fiber and the first resin body.

14. The optical connecting device according to claim 10, wherein the second area of the principal surface of the supporting part appears on an outward surface of the optical connecting device.

15. The optical connecting device according to claim 10, wherein the first lid part appears on an outward surface of the optical connecting device.

16. A method for fabricating an optical connecting device comprising:
   preparing a supporting part including a groove with a first face and a second face, the first face and the second face extending in a direction of an axis;
   placing an optical fiber and a first resin on a principal surface of the supporting part;
   placing a first lid part on the first resin and the optical fiber outside the groove, the supporting part, the optical fiber, and the first lid part being arranged in order in a direction normal to the principal surface of the supporting part;
   curing the first resin after the first lid part is placed;
   placing a second resin and a guide part on the principal surface of the supporting part, the second resin being apart from the first resin; and
   curing the second resin after the second resin and the guide part are placed,
   the first lid part being pressed in curing the first resin, and
   the guide part being supported by the first face and the second face of the groove in curing the second resin.

17. The method according to claim 16, further comprising, prior to curing the second resin, placing a second lid part apart from the optical fiber on the second resin and the guide part, wherein
   the second lid part is apart from the first lid part, and
   the second lid part is pressed in curing the second resin.

18. The method according to claim 16, wherein
   the guide part is pressed in curing the second resin, and
   the method further comprises:
   after curing the second resin, supplying an additional resin onto the guide part, the additional resin being apart from the first lid part; and
   curing the additional resin.

19. The method according to claim 16, wherein curing the first resin and curing the second resin are carried out in a single curing process, and the first lid part and the guide part are pressed with a single pressing tool.

20. A method for fabricating an optical processing apparatus comprising:
   preparing an assembly including an optical connecting device and a silicon photonics device mounting the optical connecting device;
   disposing a semiconductor device and the silicon photonics device of the assembly on a circuit board; and
   after disposing the semiconductor device and the silicon photonics device, applying a thermal process for solder reflow to the circuit board,
   the optical connecting device including a holder, an optical fiber supported by the holder, and a guide part supported by the holder,
   the holder including a first resin body, a second resin body, a supporting part, and a first lid part,
   the supporting part having a first end face, a second end face, a principal surface, a groove extending in a direction of an axis on the principal surface, and a supporting groove extending from the first end face to the second end face in the direction of the first axis in the principal surface of the supporting part, the first end face and the second end face being arranged in the direction of the first axis with the first end face being opposite to the second end face, the groove having a first face and a second face,
   the first resin body being disposed in contact with the optical fiber between the supporting part and the first lid part,
   the supporting part, the optical fiber, and the first lid part being arranged in order in a direction normal to the principal surface of the supporting part,
   the guide part being supported in the groove by the first face and the second face, the second resin body bonding the guide part to the supporting part,
   the first resin body being apart from the second resin body,
   the optical fiber extending in the direction of the axis in the principal surface of the supporting part, and
   the first lid part being disposed apart from the guide part on the optical fiber, the optical fiber being sandwiched between the principal surface of the supporting part and a principal surface of the first lid part.

* * * * *